United States Patent
Bradford

(10) Patent No.: US 9,547,870 B1
(45) Date of Patent: Jan. 17, 2017

(54) SYSTEM AND METHODS FOR SELECTIVE ADVERTISING

(75) Inventor: David K. Bradford, San Rafael, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 665 days.

(21) Appl. No.: 11/934,590

(22) Filed: Nov. 2, 2007

(51) Int. Cl.
*G06Q 30/02* (2012.01)

(52) U.S. Cl.
CPC ...... *G06Q 30/0269* (2013.01); *G06Q 30/0277* (2013.01)

(58) Field of Classification Search
CPC .............. G06Q 30/0277; G06F 17/30867
See application file for complete search history.

(56) References Cited

U.S. PATENT DOCUMENTS

| | | | |
|---|---|---|---|
| 2001/0020242 A1* | 9/2001 | Gupta et al. | 707/501.1 |
| 2002/0046089 A1* | 4/2002 | Zorn | 705/14 |
| 2002/0111863 A1* | 8/2002 | Landesmann | 705/14 |
| 2003/0037041 A1* | 2/2003 | Hertz | 707/1 |
| 2004/0064334 A1* | 4/2004 | Nye | 705/1 |
| 2004/0078334 A1* | 4/2004 | Malcolm et al. | 705/50 |
| 2004/0139001 A1* | 7/2004 | Henriques et al. | 705/39 |
| 2004/0204958 A1* | 10/2004 | Perkins et al. | 705/1 |
| 2006/0026071 A1* | 2/2006 | Radwin | 705/14 |
| 2006/0036530 A1* | 2/2006 | Shkedy | 705/37 |
| 2006/0100892 A1* | 5/2006 | Ellanti | 705/1 |
| 2007/0022375 A1* | 1/2007 | Walker | 715/513 |
| 2007/0118892 A1* | 5/2007 | Sastry et al. | 726/10 |
| 2007/0239527 A1* | 10/2007 | Nazer et al. | 705/14 |
| 2008/0010133 A1* | 1/2008 | Pyhalammi et al. | 705/14 |
| 2008/0010198 A1* | 1/2008 | Eliscu | 705/40 |
| 2008/0065602 A1* | 3/2008 | Cragun et al. | 707/3 |
| 2008/0086759 A1* | 4/2008 | Colson | 726/2 |
| 2008/0208548 A1* | 8/2008 | Metzger et al. | 703/6 |
| 2008/0215436 A1* | 9/2008 | Roberts | 705/14 |
| 2008/0228598 A1* | 9/2008 | Leff et al. | 705/27 |
| 2008/0275771 A1* | 11/2008 | Levine | 705/14 |
| 2009/0024462 A1* | 1/2009 | Lin | 705/14 |

* cited by examiner

*Primary Examiner* — Mohammad S Rostami
(74) *Attorney, Agent, or Firm* — Norton Rose Fulbright US LLP

(57) ABSTRACT

A system and method of selective advertising where an advertiser can decide whether or not to advertise to a certain user based on credential information submitted by that user. The user provides his or her credential information to a search engine and enters a search query. In response, the search engine evaluates the user's credential information and compares that information to criteria provided by advertisers that participate with that search engine. The search engine determine which advertisers have indicated a willingness to advertise to a user with the submitted credentials and selectively provides matching search results.

18 Claims, 3 Drawing Sheets

SYSTEM AND METHODS FOR SELECTIVE ADVERTISING

TECHNICAL FIELD

The present invention relates to a system and methods for selective advertising. More specifically, the present invention relates to a system and methods for selective advertising where an advertiser decides to advertise to a user based upon credential information submitted by that user.

BACKGROUND OF THE INVENTION

The process by which a search engine returns search results in response to a user query is inefficient for those who advertise on that search engine. For instance, when a user enters a query, a search engine provides results that are largely based on the search words themselves. Moreover, the order in which the results are returned is largely based upon the amount of money an advertiser pays the search engine—with the higher-paying advertisers appearing near the top of the page, and lower-paying advertisers appearing near the bottom of the page, or on subsequent pages. In any event, the search results that are returned, and the order in which they are returned, do not depend on the user's capacity to purchase. As will be discussed, this provides a less than ideal marketing system for such advertisers.

Oftentimes, a user's query includes search terms that relate to a product the user wishes to purchase. In response to the query, a search engine provides results that represent an index of the search terms. Commonly, a portion of the search results are "sponsored" results, meaning that an advertiser has paid to have a link to its page prominently displayed in response to the query. By way of example, suppose a search engine is a Ferrari dealer. Under the current model, that search engine purchases search terms likely to be entered by a user searching for a Ferrari, e.g., "Ferrari," "Maranello" "F430," and "Spider," and the like. Upon entry of such a search term, a link to the dealer's homepage is prominently displayed, usually at the top of the page or in a designated area.

Unfortunately for the Ferrari dealer, there is no mechanism for it to ascertain information relating to the financial credentials of the user before the search result is populated with the advertisement. This puts the Ferrari dealer at an undue disadvantage from a cost/benefit point of view. That is, as a practical matter, the Ferrari dealer is much less concerned with marketing its vehicles to a 12 year old or someone who does not have the financial means to purchase a Ferrari. Rather, the Ferrari dealer has a much greater incentive to market its vehicles to someone who is more likely to purchase one of its vehicles. Nevertheless, there is no direct way for the Ferrari dealership to determine how likely or how capable a user, who enters a query, is to purchase a vehicle. As a result, the Ferrari dealership is forced to pay for advertising that will all to often go to waste on users that have virtually no ability to purchase its products.

SUMMARY OF THE INVENTION

Embodiments of the invention disclosed herein provide a system and methods for a user transaction method. According to an embodiment, a search engine selectively provides search results in response to a user's query. The returned results are selected by comparing financial credential information associated with the user and criteria established by advertiser that participate with the search engine.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE PREFERRED EMBODIMENT

Figure 1:
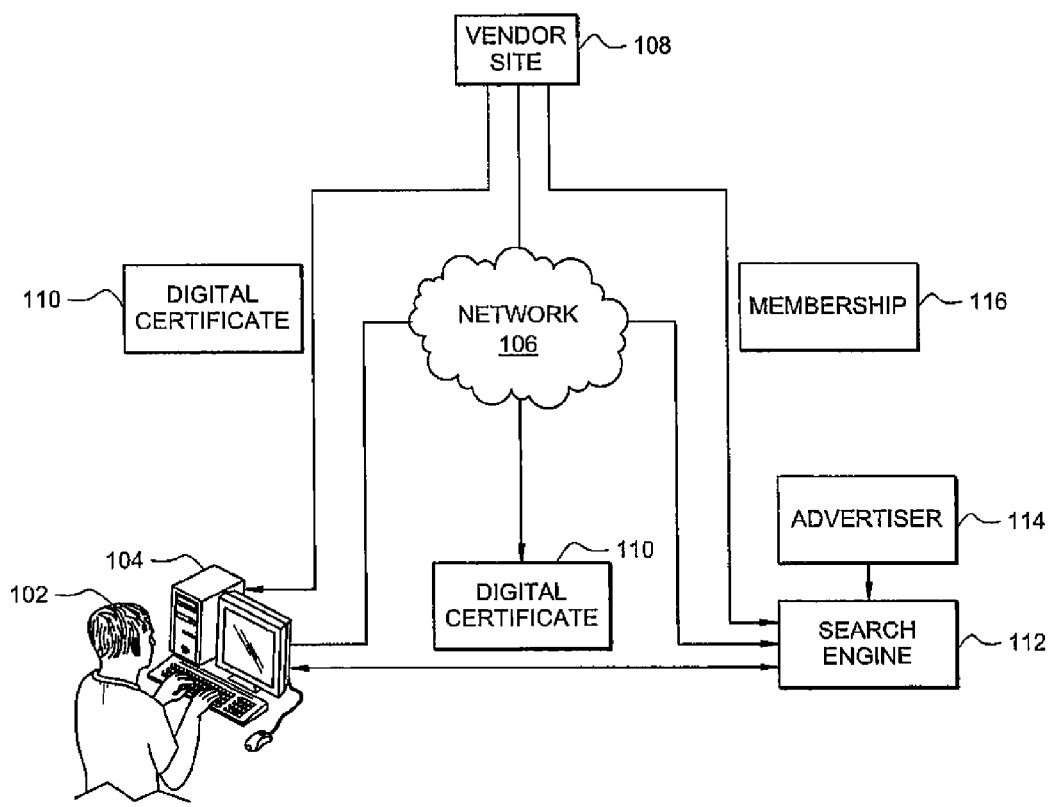
FIG. 1 depicts a system according to an embodiment of the present invention.

FIG. 1 depicts a system, such as system 100, for selective advertising according to an embodiment of the present invention. User 102, by utilizing personal computer 104, is able to access various websites over network 106. Network 106 can be an internet network having a number of configurations comprising LAN, WAN, T1, T3, and DSL segments, etc.

User 102 navigates to vendor site 108 to obtain digital certificate 110. As will be discussed in greater detail, digital certificate 110 contains credential information relating to user 102 and is utilized to determine whether or not to return a search result or advertisement to user 102. Also, in some cases the digital certificate may be used to determine the order in which search results are returned to the user. That is, vendor site 108 can be a number of websites, e.g., myfico.com, suited to provide credential information to be utilized by user 102 when searching at a search engine. Information contained in digital certificate 110 can represent a compilation of different types of information, and, in some embodiments, may be represented in the form of a score. Further, digital certificate 110 and can be stored, in digital format, on computer 104.

It should be appreciated that user 102 can receive digital certificate 110 in the form of a card from vendor site 108. It should also be appreciated that user 102 can copy digital certificate 110 from computer 104 to a portable medium, such as to a flash memory card or a mobile phone. According to such embodiments, user 102 is able to carry digital certificate 110 with him/her and can load the digital certificate from a number of different computers and then conduct a search.

In one embodiment, search engine 112 visits vendor site 108 to obtain membership 116. Search engine 112 uses membership 116 to participate in a program whereby search engine 112 displays search results in response to the user's query, dependent upon the credential information submitted by user 102 and criteria provided to search engine 112 by advertisers 114. Upon obtaining membership 116, search engine 112 is able to notify user 102 that it returned search results based upon user credential information contained in digital certificate 110 and advertiser criteria. Obtaining membership 116 may involve search engine 112 downloading software or obtaining a subscription, and the like. This, of course, encourages the user to submit credential information in exchange for more personalized search results as the user is more likely to receive personalize offers from advertisers, if those advertisers are also members.

User 102 visits a search website associated with search engine 112 and can enter one or more search words to form a query. While doing so, user 102 notices that the result page lists advertisements from merchants who have obtained membership 116 and participate in the program described above. Accordingly, user 102 submits digital certificate 110 to search engine 112, thereby providing search engine 112 with his/her credential information. As will be discussed further, in the embodiment being discussed, search engine 112 and advertisers 114 are not able to ascertain personal identity information simply because user 102 provides digital certificate 110 to search engine 112. That is, search engine 112 cannot determine the personal identity of user 102 at this point. Instead, search engine 112 can only ascertain a score associated with that user.

Once search engine 112 receives the credential information of user 102, it executes a decision-making process to determine what search results should be returned in response to the query entered by user 102. The decision-making process executed by search engine 112 is highly unique and will depend on a large number of variables. Moreover, the decision-making process is executed using propriety algorithms that will depend on the business model of search engine 112.

Search engine 112, having obtained membership 116, can utilize a user's credential information in different ways, according to the user's query. Suppose user 102 enters the query "novel." In response, search engine 112 can read the user's score and, for example, determine that user 102 is more or less likely to be able to purchase expensive crime novels. By way of further example, search engine 112 may determine that user 102 generally has a low capacity to purchase. Now suppose the same user 102 enters the query "car for sale, Dallas, Tex." In addition to the information determined above, search engine 112 may further determine, for example, that user 102 has a long history of purchasing pre-owned Ford vehicles. Accordingly, search engine 112 may return advertising results only relating to used, lower-priced, Ford vehicles in the Dallas area. This shows how the score can be combined with other currently available data used to personalize offers to consumers using search engines.

Further suppose that, in the example described above, user 102 has a score, however derived, of 125. In returning search results, search engine 112 may only return results associated with advertisers who wish to advertise to users having a score of 125 or above. In most cases, a participating advertiser will notify search engine 112 of the range of users it will advertise to.

Figure 2:
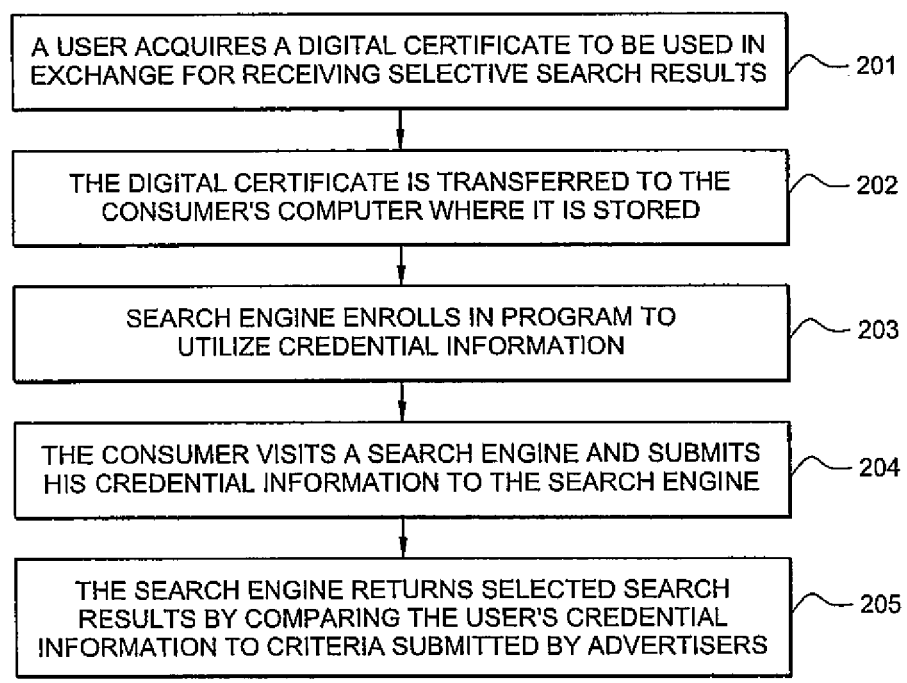
FIG. 2 depicts a method of operating the system shown in FIG. 1 according to an embodiment of the present invention.

Turning to FIG. 2, a method for selective advertising according to an embodiment of the present invention is depicted as method 200. Process 201 allows a user to acquire a digital certificate to be used in exchange for receiving selective search results. A user can obtain a digital certificate in a number of ways via the internet or other means known in the art. By way of example, a user can visit myfico.com and purchase a FICO webscore. In other cases, a user may be provided a subscription such that the score is updated at particular time intervals.

Process 202 returns to the user an encrypted, secure digital certificate for storage, for example, on the user's computer. The digital certificate may contain various combinations of information relating to the user. According to the shown embodiment, the digital certificate contains a unique identifier that is specific to the user, a time stamp, and a partial credit card number. As will be discussed hereinafter, a partial credit card number helps in verifying the user's identity while a transaction is being executed. The unique identifier serves to associate the digital certificate with the user. However, the unique identifier does not identify the user. That is, one cannot determine the personal identity of the user simply by knowing the unique identifier.

Further, the digital certificate may contain a score based on a number of qualities associated with the user. According to the shown embodiment, the score comprises information that indicates the user's immediate ability or capacity to pay for products within a particular price-point range. That is, the score may provide a very strong indication that a user is immediately able to pay for relatively expensive products. Likewise, the score may also be combined with currently available data such as user residence, vehicle ownership, occupation, purchase history, shopping preferences, and the like. In other embodiments, the score may be an indication of the level of risk that a user presents, e.g., user financial risk, credit history, credit score, net worth, and the like. In additional embodiments, the digital certificate may simply include a compilation of qualities associated with the user. For instance, a quality may be represented as a field in the credential information.

The specific score, and its components, can be calculated using, for example, propriety algorithms and are likely to vary according to the applications for which the user will use the digital certificate. The digital certificate may contain more or less than the information described above.

The digital certificate is stored so that it can be retrieved when needed to provide credential information to search engines at a later time. In some cases, the digital certificate can be stored on a portable storage media, e.g., a smart media card or credit/debit-type card. In such case, a user could take the information with him and send credential information from any number of computers. Also, a user's digital certificate could be transferred to a third party. The third party would be responsible for maintaining the user's digital certificate so that it can be retrieved when the user wishes to exchange his credential information for selective search results.

At step 203 a search engine enrolls in a program that allows that search engine to utilize the user's digital certificate. Step 203 may occur before, after, or during steps 201 and 202. Also, step 203 may include downloading software that enables the search engine to utilize the digital certificate and/or communicate with a third party that maintains the user's digital certificate. Step 203 may also involve obtaining a subscription, executing a licensing agreement, and the like. Accordingly, the search engine is able to read the encrypted digital certificate and utilize the credential information relating to the user.

Process 204 allows a user to visit a search engine's website and present his/her credentials. The online search engine could provide a mechanism to notify online users that it participates in the program or the user could simply try to use his/her credentials. For example, the online search engine may display a symbol or advertisement that recites, for example, "we read the FICO web score to provide selective search results based on the score." Of course, as will be readily apparent to those skilled in the art, any number of mechanisms can be employed to let the user know the online search engine participates in the program. Also, a user is free to enable or disable the digital certificate to enable or prevent a search engine from reading the credential information.

Once the user submits his/her credential information to the search engine, the search engine, under the control of process 205 returns selected search results by comparing the user's credential information to criteria submitted by advertisers. As described above the search engine can read a user's score and, for example, determine what specific products a user is most likely interested based upon the user's generic query, i.e., the search engine may determine that a user is most likely interested in a used crime book from the user's "novel" query. Further, the search engine may provide selected search results based by matching the user's score to those advertisers that have indicated a willingness to advertise to users having that score.

When the user provides the certificate, the online search engine reads the certificate or extracts the relevant field of information from the digital certificate. The search engine then examines advertisers that have indicated a willingness to advertise to consumer's having that score, or particularly quality as resented by the field of information. The search engine then selects the matching advertisers and returns their web pages or advertisement as search results. It should be appreciated that the metrics used to classify a user's credentials as good, bad, average, etc. can be different, depending upon the "target user" of the advertisers and/or search engine. Also, the search engine may use other information, currently available, or available in the future, in combination with the user's credentials to make a decision about how to display results to the user.

As mentioned above, a user's digital certificate contains a unique identifier that is associated with that user. However, one cannot determine the personal identity of the potential user. As such, the search engine cannot ascertain personalized information relating to the user, i.e., user name, address, place of work, etc. until the transaction is completed and the user voluntarily provides such information, e.g., by filling out credit card information on a purchase form at an advertiser's web site. At the moment the digital certificate is read, the user remains anonymous. This feature protects the user's privacy and avoids sharing sensitive information.

Figure 3:
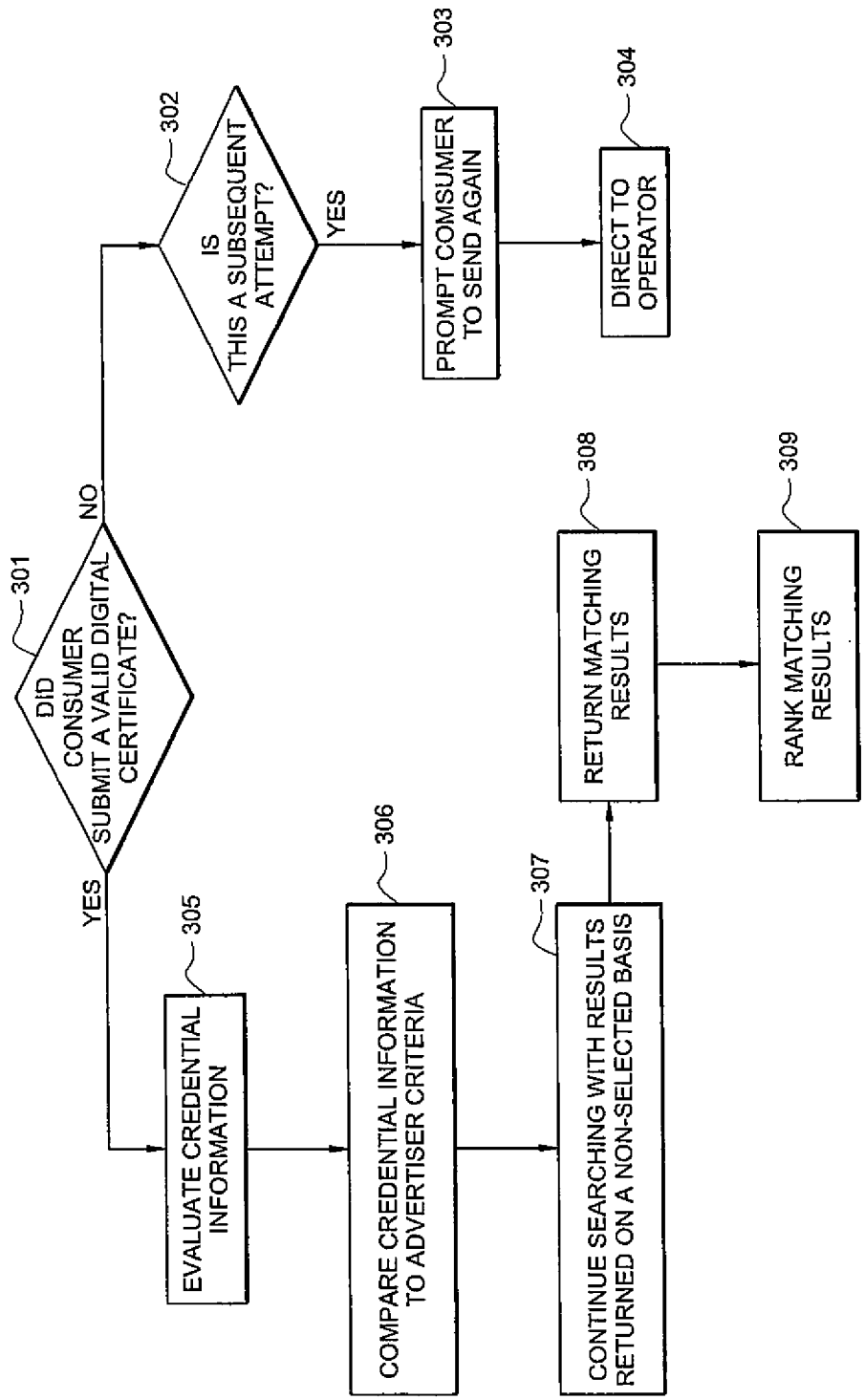
FIG. 3 depicts a decision making process executed by a search engine according to an embodiment of the present invention.

FIG. 3 depicts a decision making process executed by a search engine according to an embodiment of the present invention. The search engine executes decision-making process 300 in response to an attempt by a consumer to submit credential information. Process 301 determines if the consumer has submitted a valid digital certificate. If search engine cannot determine that the submitted digital certificate is valid, or cannot otherwise read the digital certificate, then process 302 determines whether a subsequent attempt is being made. Process 303 prompts consumer to resubmit the digital certificate. If the second attempt is unsuccessful, process 304 to handles the consumer, perhaps by directing the consumer to an operator.

When a valid certificate is reviewed, process 305 causes the search engine to evaluate the validated credential information. The evaluation may involve comparing the credential information to criteria submitted by advertisers that participate with the search engine. Process 306 determines what advertisers have indicated a willingness to advertise to users with the credential information that was submitted. If there are no matching advertisers, process 307 notifies the user to continue searching as usual results are returned on a non-selected basis.

However, if matching advertisers are found, process 308 selects the matching advertisers and returns search results based upon the match. At process 309, the matching results may be ranked according to a number of metrics, e.g., proximity, relevancy, etc.

According to embodiments disclosed herein, users and advertisers can utilize credential information submitted by the user to execute a selective marketing scheme. Users can use good credentials, e.g., good creditworthiness, to strike better bargains and extend their credentials to be used as leverage in a wide-range of different transactions. Also, advertisers gain an advantage by paying only for targeted advertising and improving their advertising cost/benefit ratio.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for dynamically creating a results page designed such that the results page excludes unwilling merchants, the method comprising:
  receiving, from one or more merchants, merchant criteria, the merchant criteria comprising one or more merchant requirements that must be satisfied for the one or more merchants to be identified as willing merchants, wherein the willing merchants are merchants willing to promote their web page with a particular user, and wherein the unwilling merchants are merchants not willing to promote their web page with the particular user;
  receiving, at a search engine from the particular user:
    a user query relating to a product or service, and
    a user presented digital certificate issued by a vendor, the presented user digital certificate comprising user credential information indicating the particular user's capacity to pay for the product or service of the user query, wherein the particular user's identity cannot be determined from the presented user digital certificate, and wherein the particular user may enable or disable the presented user digital certificate thereby enabling or preventing the search engine's ability to read the user credential information;

comparing the merchant criteria to at least some of the user credential information to:
  identify which, if any, of the one or more merchants are willing merchants and which, if any, of the one of more merchants are unwilling merchants, and
  determine how to display links to the web pages of the identified one or more willing merchants; and based at least on the comparing, dynamically creating the results page designed to exclude the unwilling merchants, wherein the results page displays the links to the web pages of the identified one or more willing merchants, wherein the results page excludes links to the web pages of the identified one or more unwilling merchants, and wherein the results page is displayed according to the determination of how to display the links to the web pages of the identified one or more willing merchants.

2. The method of claim 1 further comprising:
receiving, from the one or more merchants, a merchant membership credential issued by the vendor, wherein the results page comprises only willing merchants determined to have the merchant membership credential issued by the vendor.

3. The method of claim 1 further comprising:
determining whether or not to return any search results to the particular user upon a determination that no merchants are willing merchants.

4. The method of claim 1 further comprising:
notifying the particular user to disable the presented user digital certificate upon a determination that no merchants are willing merchants.

5. The method of claim 1 wherein the results page is designed such that the links to the web pages are in a specific order based on the presented user digital certificate and the merchant criteria.

6. The method of claim 1 wherein the presented user digital certificate further comprises demographic information of the particular user.

7. The method of claim 6 wherein the demographic information comprises: residence, occupation, purchase history, and shopping preferences.

8. The method of claim 6 wherein the user credential information further comprises user credit history information and user credit score information.

9. The method of claim 6 wherein the links to the web pages of the results page are only from the merchants determined to be within a proximity to the particular user's residence.

10. A system, which dynamically creates a results page designed such that the results page excludes unwilling merchants, the system comprising:
a memory; and
one or more processors coupled to the memory and configured to:
receive, from one or more merchants, merchant criteria, the merchant criteria comprising one or more merchant requirements that must be satisfied for the one or more merchants to be identified as willing merchants, wherein the willing merchants are merchants willing to promote their web page with a particular user, and wherein the unwilling merchants are merchants not willing to promote their web page with the particular user;

receive, at a search engine from the particular user
  a user query relating to a product or service, and
  a user presented digital certificate issued by a vendor, the presented user digital certificate comprising user credential information indicating the particular user's capacity to pay for the product or service of the user query, wherein the particular user's identity cannot be determined from the presented user digital certificate, and wherein the particular user may enable or disable the presented user digital certificate thereby enabling or preventing the search engine's ability to read the user credential information;

compare the merchant criteria to at least some of the user credential information to:
  identify which, if any, of the one or more merchants are willing merchants and which, if any, of the one of more merchants are unwilling merchants, and
  determine how to display links to the web pages of the identified one or more willing merchants; and based at least on the comparison, dynamically create the results page designed to exclude the unwilling merchants, wherein the results page display the links to the web pages of the identified one or more willing merchants, wherein the results page excludes links to the web pages of the identified one or more unwilling merchants, and wherein the results page is displayed according to the determination of how to display the links to the web pages of the identified one or more willing merchants.

11. The system of claim 10 further comprising:
receive, from the one or more merchants, a merchant membership credential issued by the vendor, wherein the results page comprises only willing merchants determined to have the merchant membership credential issued by the vendor.

12. The system of claim 10 further comprising:
determine whether or not to return any search results to the particular user upon a determination that no merchants are willing merchants.

13. The system of claim 10 further comprising:
notify the particular user to disable the presented user digital certificate upon a determination that no merchants are willing merchants.

14. The system of claim 10 wherein the results page is designed such that the links to the web pages are in a specific order based on the presented user digital certificate and the merchant criteria.

15. The system of claim 10 wherein the presented user digital certificate further comprises demographic information of the particular user.

16. The system of claim 15 wherein the demographic information comprises: residence, occupation, purchase history, and shopping preferences.

17. The system of claim 15 wherein the user credential information further comprises user credit history information and user credit score information.

18. The system of claim 15 wherein the links to the web pages of the results page are only from the merchants determined to be within a proximity to the particular user's residence.

* * * * *